US012638085B2

(12) United States Patent
Lecchi et al.

(10) Patent No.: US 12,638,085 B2
(45) Date of Patent: May 26, 2026

(54) PRESSURE-BALANCED VALVE WITH IMPROVED SEALING PROPERTIES

(71) Applicant: Buti Research S.r.L., Cenate Sotto (IT)

(72) Inventors: Stefano Lecchi, Bolgare (IT); Pierangelo Scaglia, Voghera (IT)

(73) Assignee: Buti Research S.r.L., Cenate Sotto (IT)

( * ) Notice: Subject to any disclaimer, the term of this patent is extended or adjusted under 35 U.S.C. 154(b) by 0 days.

(21) Appl. No.: 18/950,456

(22) Filed: Nov. 18, 2024

(65) Prior Publication Data

US 2025/0164014 A1     May 22, 2025

(30) Foreign Application Priority Data

Nov. 17, 2023     (IT) ........................ 102023000024387

(51) Int. Cl.
*F16K 3/24*          (2006.01)
*F16K 3/314*         (2006.01)
*F16K 39/04*         (2006.01)

(52) U.S. Cl.
CPC .............. *F16K 3/243* (2013.01); *F16K 3/314* (2013.01); *F16K 39/04* (2013.01)

(58) Field of Classification Search
CPC .......... F16K 3/243; F16K 3/314; F16K 3/246; F16K 39/04; F16K 47/08
See application file for complete search history.

(56) References Cited

U.S. PATENT DOCUMENTS

| 1,899,938 | A | * | 3/1933 | Buenger | ................. F16K 3/246 251/284 |
| 3,892,384 | A | | 7/1975 | Myers | |
| 4,274,433 | A | * | 6/1981 | Schnall | ................... F16K 3/267 251/282 |
| 6,641,110 | B1 | * | 11/2003 | Nguyen | ................. F16K 3/246 251/282 |
| 10,436,327 | B2 | * | 10/2019 | Faas | ........................ F16K 47/08 |
| 2003/0197144 | A1 | | 10/2003 | Nguyen | |
| 2018/0258864 | A1 | | 9/2018 | Marocchini et al. | |

* cited by examiner

*Primary Examiner* — Eric Keasel
(74) *Attorney, Agent, or Firm* — Patterson Intellectual Property Law, PC

(57)          ABSTRACT

A pressure-balanced valve is disclosed, which can be used both as a control valve and as an ON-OFF valve, whose sealing system is marked by a longer service life as compared to that of prior art solutions. The longer service life derives from the fact that the sealing elements are energized when the valve is closed, whereas they maintain a non-energized condition during valve regulation (when the closure member is subject to oscillations relative to the cage body). Advantageously, the sealing assembly as disclosed herein is easy to produce and assemble, as it can be inserted (and subsequently removed) together with the closure member, via a stem to which the closure member is connected.

12 Claims, 15 Drawing Sheets

FIG.10

PRESSURE-BALANCED VALVE WITH IMPROVED SEALING PROPERTIES

CROSS-REFERENCES TO RELATED APPLICATIONS

This application claims benefit of Italian Patent Application No. 102023000024387, filed Nov. 17, 2023, and which is hereby incorporated by reference in its entirety.

FIELD OF THE INVENTION

The present invention falls generally within the field of the construction of pressure-balanced valves. In particular, the invention relates to a pressure-balanced valve with a new dynamic sealing system. In particular, the valve according to the invention can be a control valve or alternatively an ON-OFF valve.

BACKGROUND

The use of valves, in particular control valves, provided with a pressure-balancing system, is known. Among these, balanced valves of "globe" type, provided with a valve body in which an inner cavity is defined for fluid flow between a fluid inlet section and a fluid outlet section, are known. A cage body defining a sliding seat for a closure member is arranged inside the inner cavity. The cage body comprises openings for fluid flow towards the fluid outlet section.

A stem, projecting from the valve body through an entry opening closed by a bonnet, is rigidly connected to the closure member. The stem is movable through actuation means (comprising one or more actuators) of linear or rotary type. By means of the stem, the closure member is movable between a closed position, in which fluid flow through the openings of the cage body is completely inhibited by the closure member, and a full-open position, in which said openings of the cage body are totally free, thus allowing the maximum fluid flow rate. The flow rate is adjusted by varying the position of the closure member between the closed position and the full-open position, i.e., by varying the closing/opening degree of the openings of the cage body.

In a balanced globe valve, the closure member comprises one or more pressure-balancing channels. These channels extend between a first surface of the closure member facing the fluid entering the valve and a second surface of the closure member to which the stem is connected. When the closure member is in the closed position, these channels make a first portion of the inner cavity defined between the fluid inlet port and the first surface communicating with a second portion of the inner cavity defined between the bonnet and the second surface, wherein neither of these portions is communicating with the fluid outlet section. By means of the channels, a balancing of the pressures in the aforesaid two cavity portions is obtained. Therefore, keeping the size of closure member and the fluid flow rate the same, the force that has to be applied by the one or more actuators to the stem to maintain the closure member in the closed position is much lower in a balanced valve as compared to the force required in an unbalanced valve. For this reason, pressure-balanced valves are particularly useful when the valve size becomes significant.

In order for the valve to function correctly, when the closure member is in the closed position, the fluid sealing system between the cage body and the closure member is vital. This sealing system is of dynamic type, as the closure member moves inside the cage body and hence relative thereto.

According to a first known solution, the fluid sealing system comprises lip-seals energized through a mechanical element within each of the seals. A lip seal can, for example, be made of PTFE and comprise a mechanical spring made of stainless steel inside it. This type of seal is typically received in an annular seat formed in the outer surface of the closure member and/or in the inner surface of the cage body. Due to the action of the inner spring, the seal is always in contact with the surface of the two components even in a valve open condition (i.e., when the closure member is not in the closed position). Therefore, this seal is subjected to constant wear and thus has a very limited useful life.

According to another known solution, the sealing system is based on one or more seals made of graphite. Besides undergoing very high wear (and hence having a very short service life), these seals require complex fitting operations as they must be pre-energized in the respective fitting seats. Moreover, further to wear these seals release graphite particles that contaminate the system in which the valve is located. In applications where a high degree of cleanliness is required, the use of graphite seals is in fact not practicable.

Therefore, the Applicant perceived the need to provide a new, more effective and durable, solution for ensuring a sealing between a cage body and a closure member movable therein in a pressure-balanced valve.

BRIEF SUMMARY

In view of the above, the present disclosure relates to a pressure-balanced valve that allows the problems of the prior art to be solved, or at least mitigated.

Within this aim, a first object of the present disclosure is to provide a pressure-balanced valve with improved sealing features between the cage body and the closure member.

Another object of the present disclosure is to provide a pressure-balanced valve in which the seal between the cage body and the closure member does not require complex operations to fit and/or energize the sealing rings.

Not least object of the present disclosure is to provide a pressure-balanced valve that is reliable and easy to manufacture and assemble at competitive costs.

The Applicant has found that the aim and the objects indicated above can be achieved by providing a sealing assembly, arranged between the closure member and the cage body, comprising sealing rings that in the last stage of the closing movement of the closure member remain compressed between an abutment surface defined by the cage body and a thrust flange, connected to the closure member in a floating manner and subjected to the action of elastic means. The sealing rings are mechanically energized each time the valve is closed and lose their energized condition when the valve is partially or fully opened.

In particular, the aim and the objects indicated above are achieved through a pressure-balanced valve comprising:
  a valve body comprising a fluid inlet port and a fluid outlet port, wherein said valve body delimits an inner cavity that makes the fluid inlet port communicating with the fluid outlet port and wherein the inner cavity can be accessed through a top entry opening of the valve;
  a removable bonnet closing the top entry opening;
  a cage body arranged in the inner cavity and associated with the valve body in a fixed position, wherein the cage body defines a sliding seat for a closure member and wherein the cage body comprises at least one lateral opening for fluid flow;

a closure member movable in the sliding seat between a closed position, whereby the lateral opening of the cage body is closed, and a full-open position, whereby the lateral opening of the cage body is totally free, wherein said closure member comprises at least one pressure-balancing channel extending between a first surface of the closure member and a second surface of the closure member, wherein the channel makes a first portion of the inner cavity delimited between the fluid inlet port and the first surface of the closure member communicating with a second portion of the inner cavity delimited between the bonnet and the second surface of the closure member, a stem comprising a first end connected to the closure member at the second surface and a second end connected to one or more valve actuators, wherein said stem extends through the second portion of the inner cavity;

a sealing assembly providing the fluid seal between the second portion of the inner cavity and a third portion of the inner cavity communicating with the outlet port.

According to an embodiment, the sealing assembly comprises:

at least one sealing ring arranged about a first cylindrical portion of the closure member and contacting a first cylindrical portion of the sliding seat of the cage body, wherein the first cylindrical portion of the sliding seat is axially delimited by a first abutment surface and wherein the first cylindrical portion of the closure member is axially delimited by a second abutment surface, at least one thrust annular flange arranged in the second portion of the inner cavity in a position adjacent to the second surface of the closure member, wherein the thrust flange comprises an annular edge in contact with a first surface of said at least one sealing ring and wherein the thrust annular flange is axially floating relative to the closure member;

elastic means pushing the annular flange towards the second surface of the closure member.

Moreover, according to the present disclosure, the abutment surfaces are defined so that, when said closure member moves towards said closed position, said at least one sealing ring comes into abutment, at a side opposite to the side contacting the annular edge, with the first abutment surface before said closure member reaches the closed position.

According to an embodiment, the at least a sealing ring lacks energizing elastic inserts.

According to an embodiment, the sealing assembly comprises a plurality of sealing rings arranged in a packed configuration, wherein a sealing ring comes into abutment with the first abutment surface when the closure member moves towards the closed position and before said closure member reaches the closed position, and wherein another sealing ring is in contact with the annular edge of the thrust flange.

According to another embodiment, the sealing assembly comprises a plurality of sealing rings arranged in a packed configuration, wherein a first outer sealing ring contacts the first sealing surface or the second sealing surface and a second outer sealing ring is contacted by the annular edge of the thrust flange; said plurality of sealing rings comprising at least one central sealing ring in contact with the first outer sealing ring and with the second outer sealing ring.

According to an embodiment, the plurality of sealing rings comprises two central sealing rings in contact with each other, wherein each central sealing ring contacts one of said outer sealing rings.

According to an embodiment, the sealing rings have a cross section of a substantially trapezoidal shape, wherein said cross section is evaluated in a radial section plane.

According to an embodiment thereof, the thrust flange comprises a plane-shaped portion having an annular shape and the annular edge projects from an end of the plane-shaped portion in a direction substantially perpendicular to a reference plane in which said plane-shaped portion extends.

According to an embodiment, the thrust flange is coupled in an axially floating manner with the closure member by means of a plurality of coupling pins projecting from the second surface of the closure member, wherein each coupling pin extends through an opening formed in the plane-shaped portion of the thrust flange.

According to a possible embodiment thereof, the elastic means comprise a plurality of springs each arranged about one of the coupling pins so as to be axially interposed between the thrust flange and a stop means fixed to the coupling pin, wherein the thrust flange is located between the springs and the second surface of the closure member.

According to an embodiment, the stop means comprise at least one nut screwed at a free end of a corresponding coupling pin.

According to an embodiment thereof, the closure member comprises a second cylindrical portion having a diameter greater than the diameter of the first cylindrical portion and wherein the sliding seat of the cage body comprises a second cylindrical portion having a diameter smaller than the diameter of the first cylindrical portion of the sliding seat; the second cylindrical portion of the closure member contacting the second cylindrical portion of the sliding seat.

According to a possible embodiment, the valve comprises a valve body extension connected to the valve body at the top entry opening, wherein the valve body extension defines an entry opening of the valve, wherein this entry opening is closed by the bonnet, and the valve body extension is traversed by the stem and defines an inner chamber having an annular shape inside which a thermal insulation assembly is removably received.

BRIEF DESCRIPTION OF THE DRAWINGS

Further features and advantages of an invention as disclosed herein shall become more evident from the following detailed description of embodiments thereof, set forth below, by way of non-limiting example, with reference to the accompanying drawings, wherein:

FIG. 10 is a longitudinal section view of the component assembly of FIG. 8;

The same reference numbers and letters in the figures identify the same elements or components.

DETAILED DESCRIPTION

Figure 13:
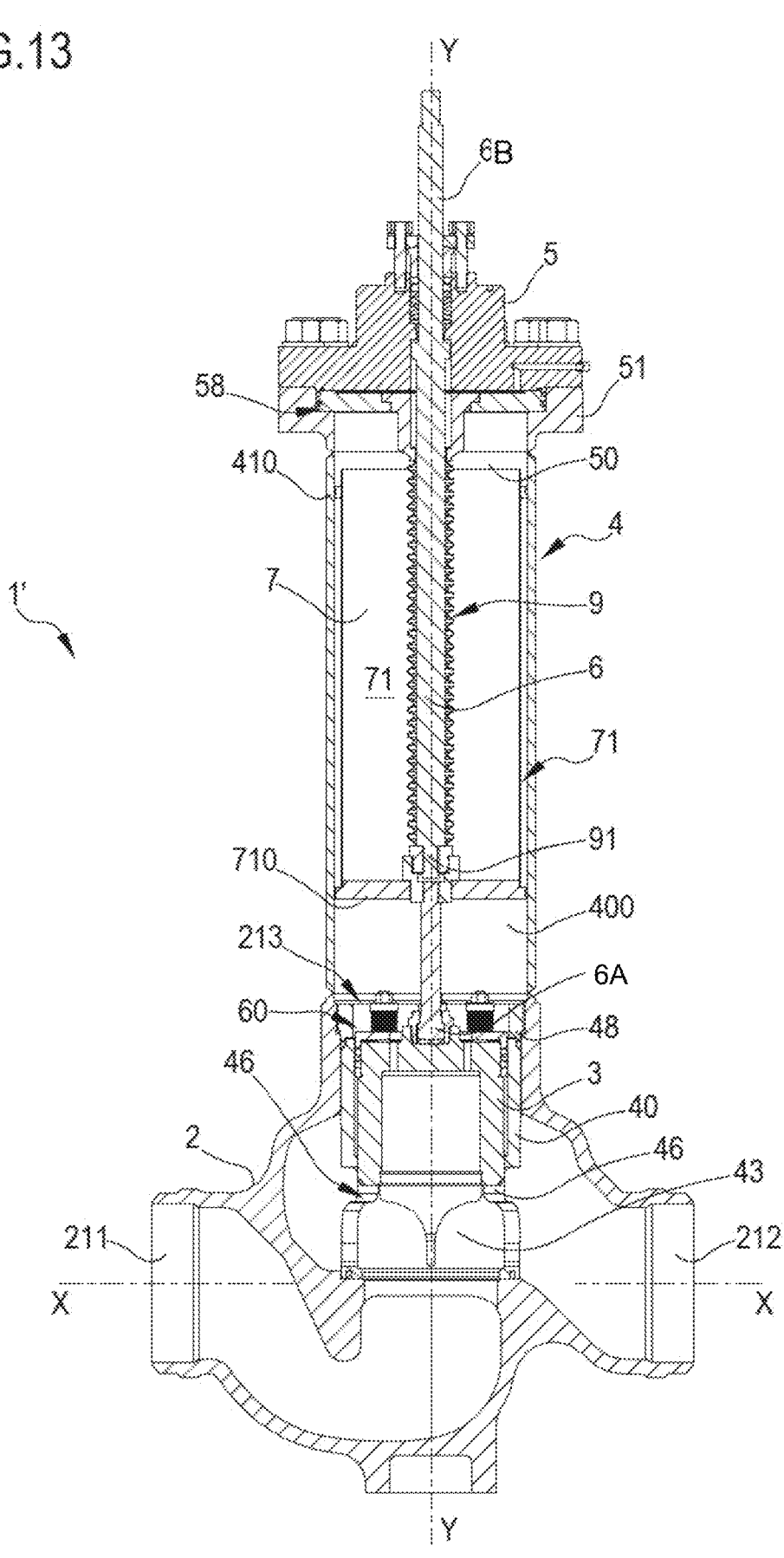
FIG. 13 is a longitudinal section view of another embodiment of a valve according to the invention.
Figure 14:
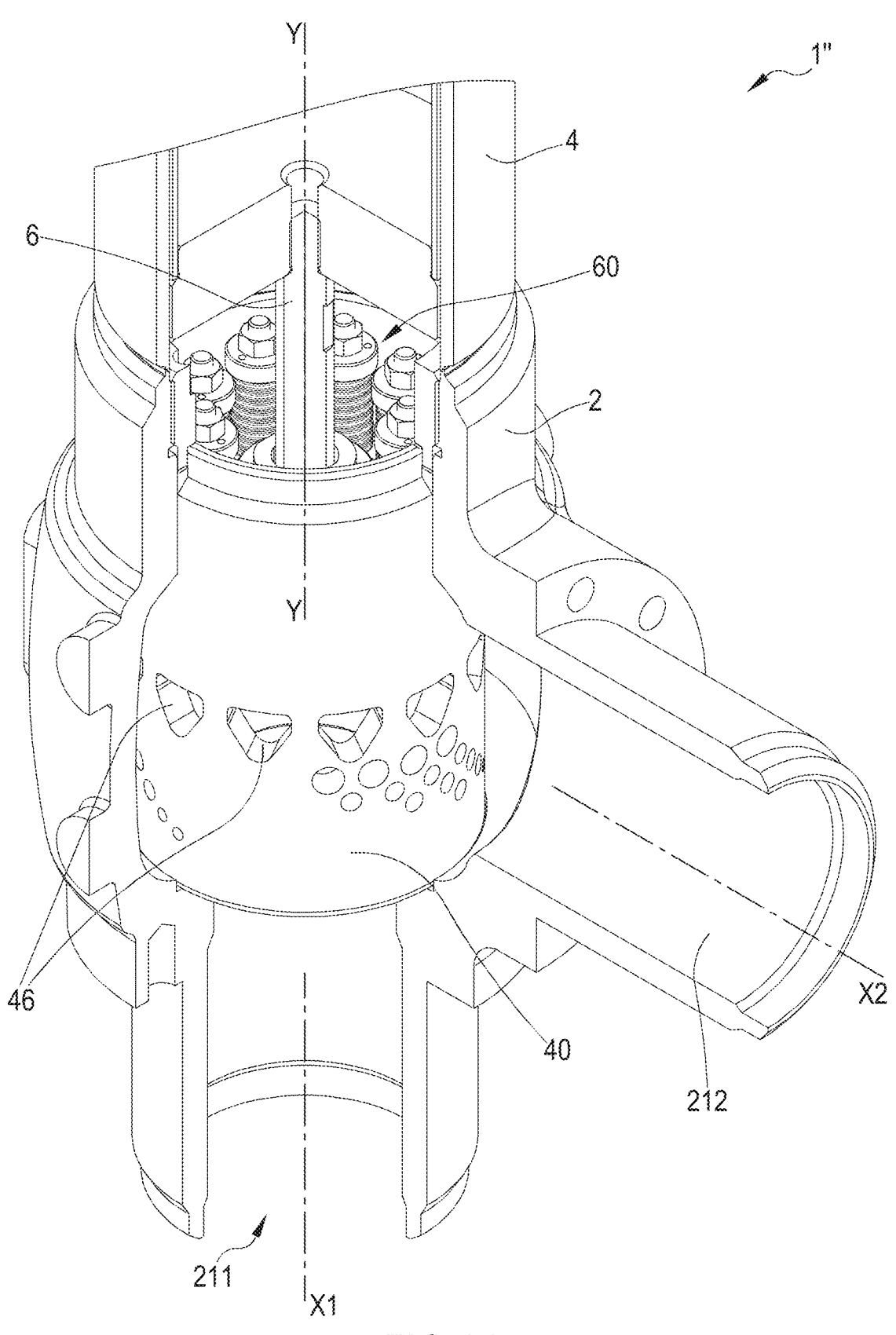
FIGS. 14 and 15 are partially sectional, perspective views of further embodiments of a valve according to the invention.
Figure 15:

The present invention refers to a pressure-balanced valve, wherein this valve can be a control valve or also an ON-OFF valve. FIGS. 1 to 12 refer to a valve (generically indicated by reference 1) according to the present disclosure, which can be used to control the flow rate of a fluid. FIG. 13 instead refers to a valve with an extended configuration particularly intended for controlling the flow/flow rate in cryogenic applications, wherein in this context "cryogenic applications" means applications that require operating temperatures less than or equal to −150° C. (123 K). FIG. 14 refers to a further embodiment of a pressure-balanced valve according to the invention that can be used as a control valve; finally, FIG. 15 shows an embodiment of a pressure-balanced valve according to the invention that can be used as an ON-OFF valve.

With reference to FIGS. 1 to 12, the valve 1 comprises a valve body 2 having a fluid inlet port 211 and a fluid outlet port 212. The valve body 2 comprises an inner cavity 20 extending between the fluid inlet port 211 and the fluid outlet port 212, making them communicate. The valve body 2 may typically be made in one piece and its configuration generally corresponds to the configuration of a control valve of "globe" type.

The fluid inlet port 211 and the fluid outlet port 212 have a common axis X-X. Alternatively, the ports 211, 212 could be defined so that their respective axes are parallel, but not coincident (i.e., so that they do not have a common axis).

The valve body 2 comprises an entry opening 213 for accessing the cavity 20. In the embodiment shown in the figures, the entry opening 213 has a longitudinal axis Y-Y substantially orthogonal to the axis X-X of the other mentioned openings 211, 212. Alternatively, the longitudinal axis Y-Y could also not be orthogonal to the axis X-X. Hereinafter, the terms "axial" and axially" refer to a condition of parallelism with the longitudinal axis Y-Y, while the terms "transversal", "transversely" indicate a condition of orthogonality to said longitudinal axis Y-Y.

The valve 1 comprises a cylindrical cage body 40 arranged inside said cavity 20 of the valve body 2. More precisely, the cage body 40 is coupled to the valve body 2 so as to maintain a fixed position within the cavity 20, i.e., a fixed position relative to the same valve body 2.

The cage body 40 defines a cylindrical sliding seat 43 (clearly visible in FIG. 11) in which a closure member 3 of the valve 2 can translate. At least a portion of this sliding seat 43 defines a guide for the axial movement of the closure member 3. The cage body 40 comprises at least a lateral opening 46 (for example, a plurality of lateral openings 46) for fluid flow. In detail, each lateral opening 46 allows fluid flow between the volume inside the cylindrical sliding seat 43 (in communication with the fluid inlet port 211) and the volume outside the cage body 40 (in communication with the fluid outlet port 212).

The valve 1 comprises a cylindrical closure member 3 slidingly arranged in the sliding seat 43 of the cage body 40. Therefore, the closure member 3 is coaxial with the cage body 40 and can slide along the longitudinal axis Y-Y indicated above. More precisely, the closure member 3 is movable in said sliding seat 43 between a closed position (shown in FIGS. 5 and 6) and a full-open position (shown in FIGS. 1 and 2).

When the closure member 3 is in the closed position, the fluid entering the valve cannot flow through the lateral opening(s) 46 of the cage body 40, so that the fluid flow rate at the fluid outlet port 212 is zero (i.e., the output flow rate leaving the valve is zero). When the closure member 3 is in a full-open position, the entire fluid flow rate can flow through the lateral openings 46 and reach the fluid outlet port 212. Flow rate control is achieved by translating the closure member 3 in an intermediate position between the closed position and the full-open position. Basically, the output flow rate depends on the position of the closure member 3 relative to the lateral openings 46 of the cage body 40.

The closure member 3 is provided with at least one channel 51 extending between a first surface 311 and a second surface 312 thereof. These surfaces 311, 312 may typically be transverse to the longitudinal axis Y-Y. This at least one channel 51 makes a first portion 21 of the inner cavity 20 of the valve body 2 communicating with a second portion 22 of the inner cavity 20. In particular, the first portion 21 is delimited between the fluid inlet port 211 and the first surface 311 of the closure member 3, whereas the second portion 22 is delimited between the bonnet 5 of the valve 2 and the second surface 312 of the closure member 3. By means of this channel 51, the fluid pressure between the first portion 21 and the second portion 22 of the inner cavity 20 is balanced when the closure member 3 is in the closed position. Hereinafter, the second portion 22 of the inner cavity will also be indicated by the expression balancing chamber 22.

According to an embodiment shown in the figures, the closure member 3 comprises a plurality of pressure-balancing channels 51 extending between the first surface 311 and the second surface 312 of the closure member, as indicated above. These channels 51 may extend parallel to the longitudinal axis Y-Y and have a substantially circular cross section. These channels 51 are also arranged along a circumference (having a diameter indicated by reference dr in FIG. 12) and are angularly equally spaced apart from one another (see for example FIG. 9).

Figure 1:
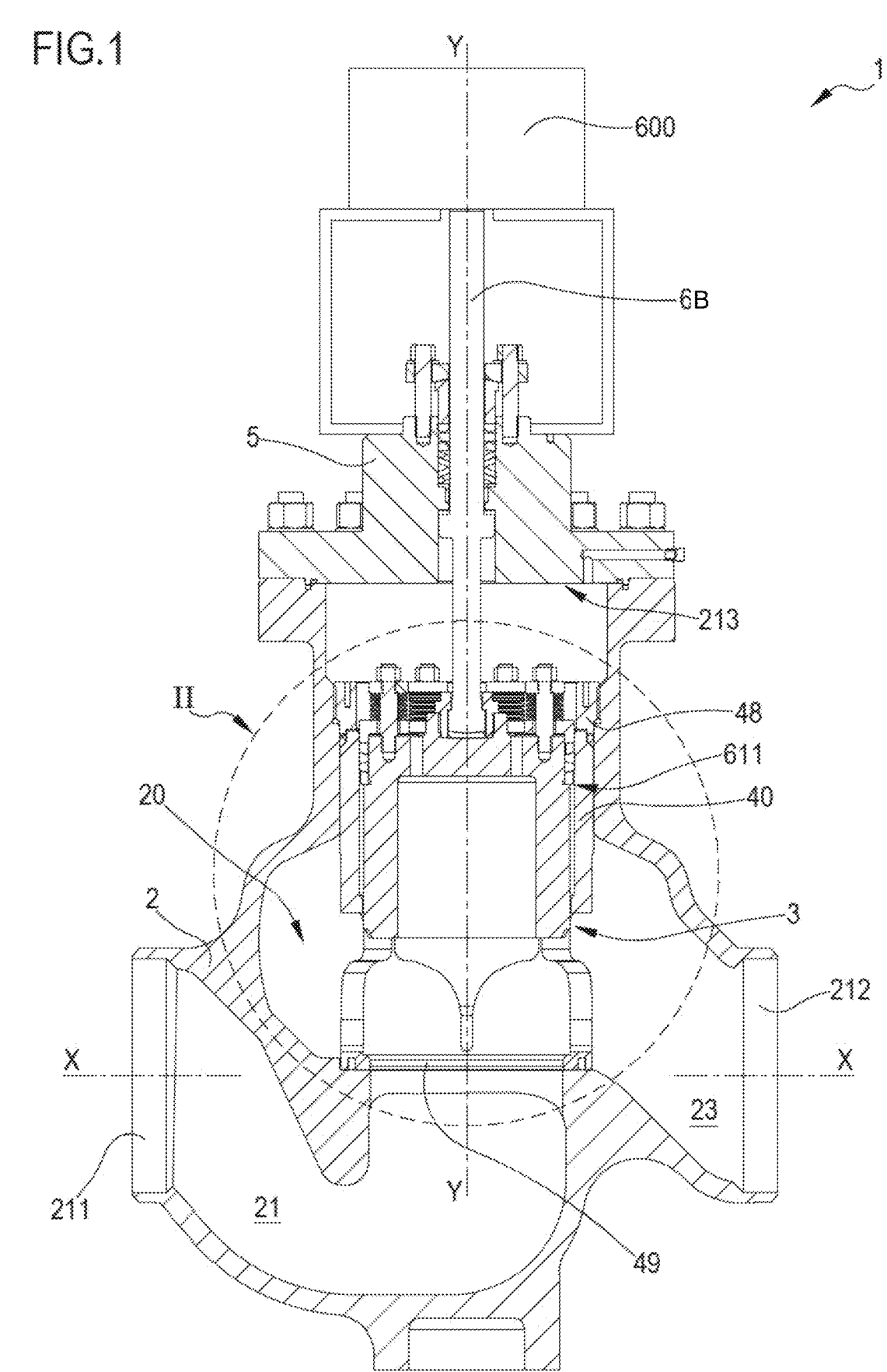
FIG. 1 is a longitudinal section view of a first embodiment of a valve according to the invention in a first operating configuration.

The valve 1 according to the invention further comprises a stem 6 provided with a first end 6A connected to the closure member 3 at the second surface 312 indicated above. A second end 6B of the stem 6 projects from the bonnet 5 of the valve and is connected to one or more actuators comprising a motor, a handwheel or any other means known to those skilled in the art and useful for moving the stem 6 along the longitudinal axis Y-Y. In FIG. 1 examples of such actuation means are schematically shown as a block indicated by reference 600.

The valve 1 comprises a sealing assembly 60 configured to ensure the fluid seal between the sliding seat 43 of the cage body 40 and the closure member 3 when the latter is in the closed position. Basically, the sealing assembly 60 is configured to provide, when the valve is closed, the seal between the balancing chamber 22 and a third portion 23 of the inner cavity 20, which extends around the cage body 40 and is communicating with the fluid outlet port 212. When the valve is closed (i.e., when the closure member 3 is in the closed position), this third portion 23 of the inner cavity 20 is not hydraulically communicating with the first portion 21 of the cavity 20 defined above.

With reference to FIG. 1, the sealing assembly 60 comprises a plurality of sealing rings 61, 62, 63, 64 arranged about the closure member 3, more precisely contacting an inner cylindrical surface Si thereof (indicated in FIG. 10) the surface of a first cylindrical portion of the closure member 3, so as to form a "packed" sealing structure. The sealing rings 61, 62, 63, 64 contact, at an outer cylindrical surface Se thereof (indicated in FIG. 10), the surface of a first cylindrical portion 431 of the sliding seat 43. Therefore, the two cylindrical portions 331, 431 indicated above have different diameters (respectively D2 and D2*, respectively indicated in FIGS. 10 and 11), thereby defining an annular seat 611 in which the sealing rings 61, 62, 63, 64 are arranged.

The first cylindrical portion 431 of the sliding seat 43 at least partially delimits the pressure-balancing chamber 22 indicated above. The first cylindrical portion of the closure member 2 extends from the second surface 312 of the closure member. The first cylindrical portion 431 is axially delimited by a first abutment surface 66A, which may typically be inclined relative to the longitudinal axis Y-Y, for example by an angle of 45°. The first cylindrical portion 331 of the closure member 33 is axially delimited by a second abutment surface 66B that may typically extend orthogonally to the longitudinal axis Y-Y.

Both surfaces 66A, 66B are define an abutment for the packed sealing structure formed by the sealing rings 61, 62, 63, 64. More precisely, depending on the operating condition of the valve, in particular depending on the axial position taken by the closure member 3, one of said sealing rings (indicated by reference 61) contacts said abutment surfaces 66A, 66B, as better explained below.

According to the present disclosure, the sealing assembly 60 comprises a thrust annular flange 68 (hereinafter also briefly flange 68) arranged in said balancing chamber 22 of the inner cavity 20 in a position adjacent to the second surface 312 of the closure member 3. The thrust flange 68 comprises an annular edge 69 at least partly inserted in said annular seat 611. This annular edge 69 contacts a sealing ring element (indicated by reference 64) of the packed sealing structure. In particular, the flange 68 is coupled to the closure member 3 so as to be axially floating relative to the closure member itself. By the expression "axially floating" a condition is meant whereby the flange 68 is axially drawn together with the closure member 3, but maintains a translational degree of freedom relative to the closure member 3 along a direction parallel to the longitudinal axis Y-Y.

The sealing assembly 60 further comprises elastic means 65 acting on the flange 68 so as to push it towards the second surface 312 of the closure member 3. More precisely, the elastic means 65 apply a force on the flange 68 such that the annular edge 69 is maintained in contact with the packed sealing structure (in particular with the sealing ring 64).

According to the present disclosure, the two abutment surfaces 66A, 66B are defined so that the packed sealing assembly, in particular the first sealing ring 61, comes into abutment with said first abutment surface 66A before said closure member 3 reaches said closed position. In this way, during subsequent completion of the stroke of the closure member 3 towards the closed position, the sealing rings 61, 62, 63, 64 remain compressed between said first abutment surface 66A (fixed relative to the inner cavity 20) and the annular edge 69 of the flange 68 (movable in axial direction) and thus expand in the annular seat 611 producing the seal.

In other words, during the last stage of the stroke of the closure member 3, further to the contact with the first abutment surface 66A, the sealing rings 61, 62, 63, 64 become energized. Therefore, unlike prior art solutions, energizing of the sealing rings occurs mechanically whenever and only when the closure member 3 is brought into the closed position.

Figure 3:
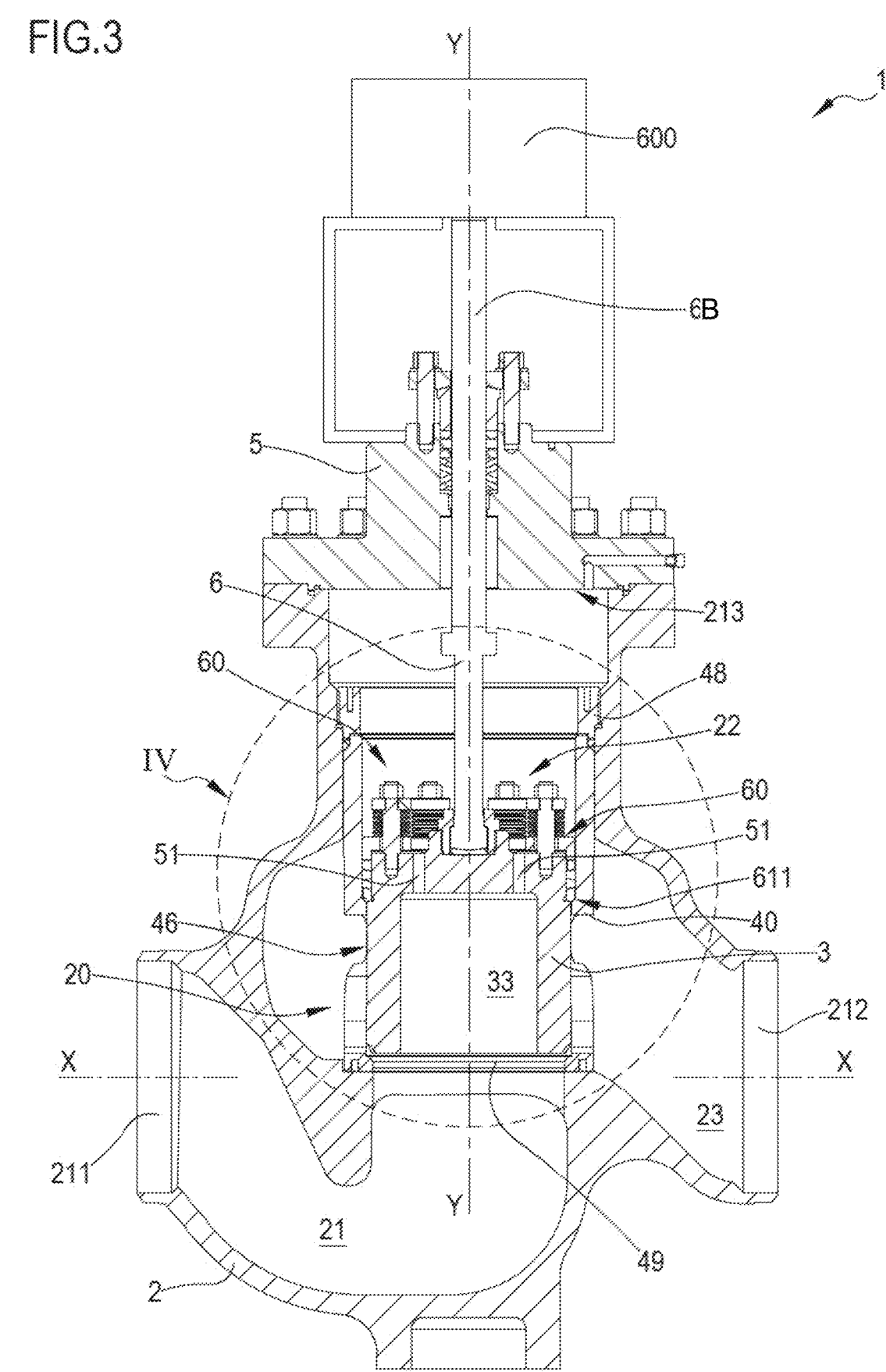
FIG. 3 is another longitudinal section view of the valve of FIG. 1 in a second operating configuration.
Figure 4:
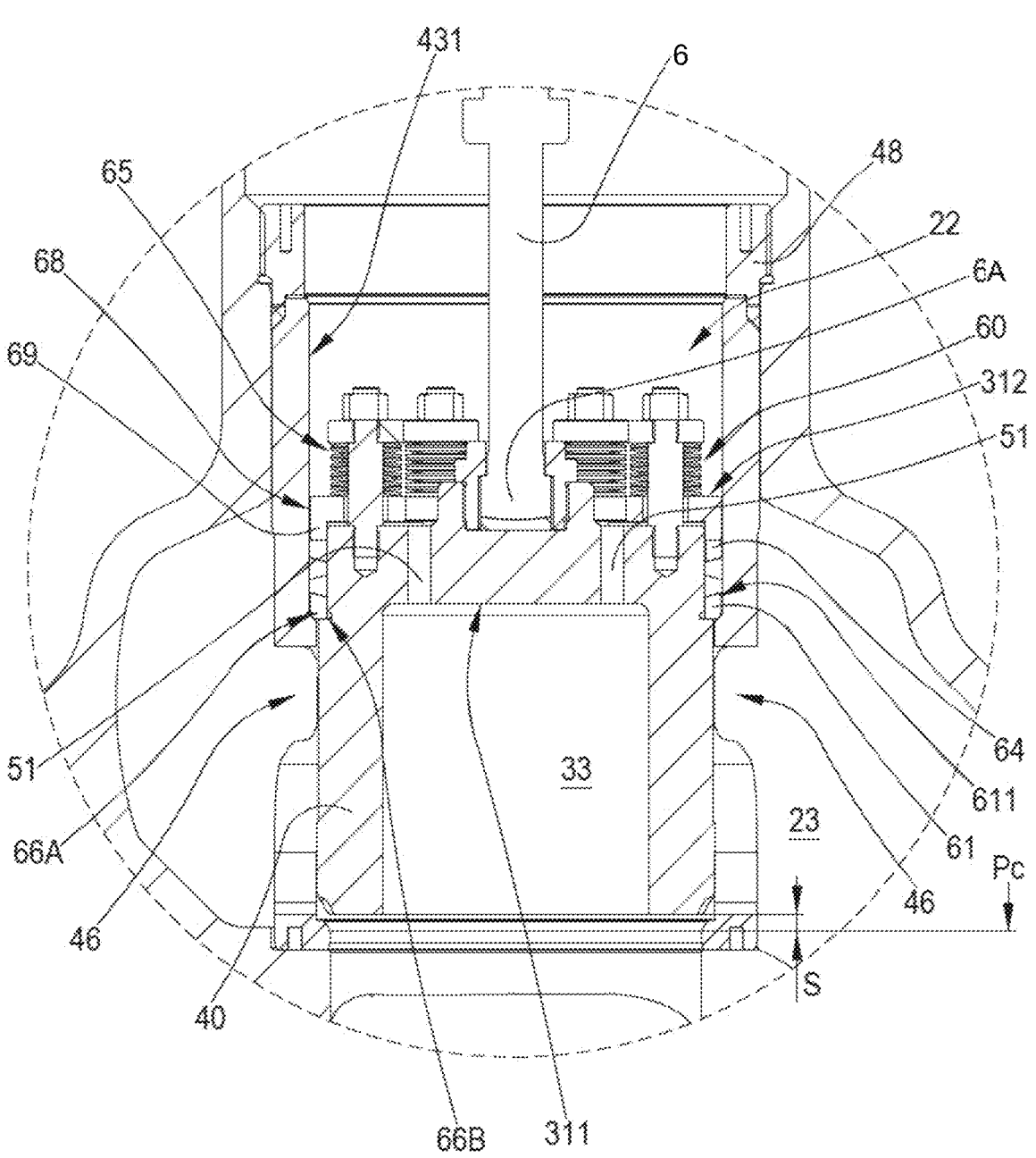
FIG. 4 is an enlargement of the detail IV of FIG. 3.

FIGS. 3 and 4 show the closure member 3 in the position in which energizing of the sealing rings 61, 62, 63, 64 begins. It can be noted that in this position the two abutment surfaces 66A, 66B are substantially at the same height relative to the plane indicated by PC in FIGS. 4 and 6. The plane PC is the plane in which the closure member 3 reaches the full-closed position.

Figure 6:
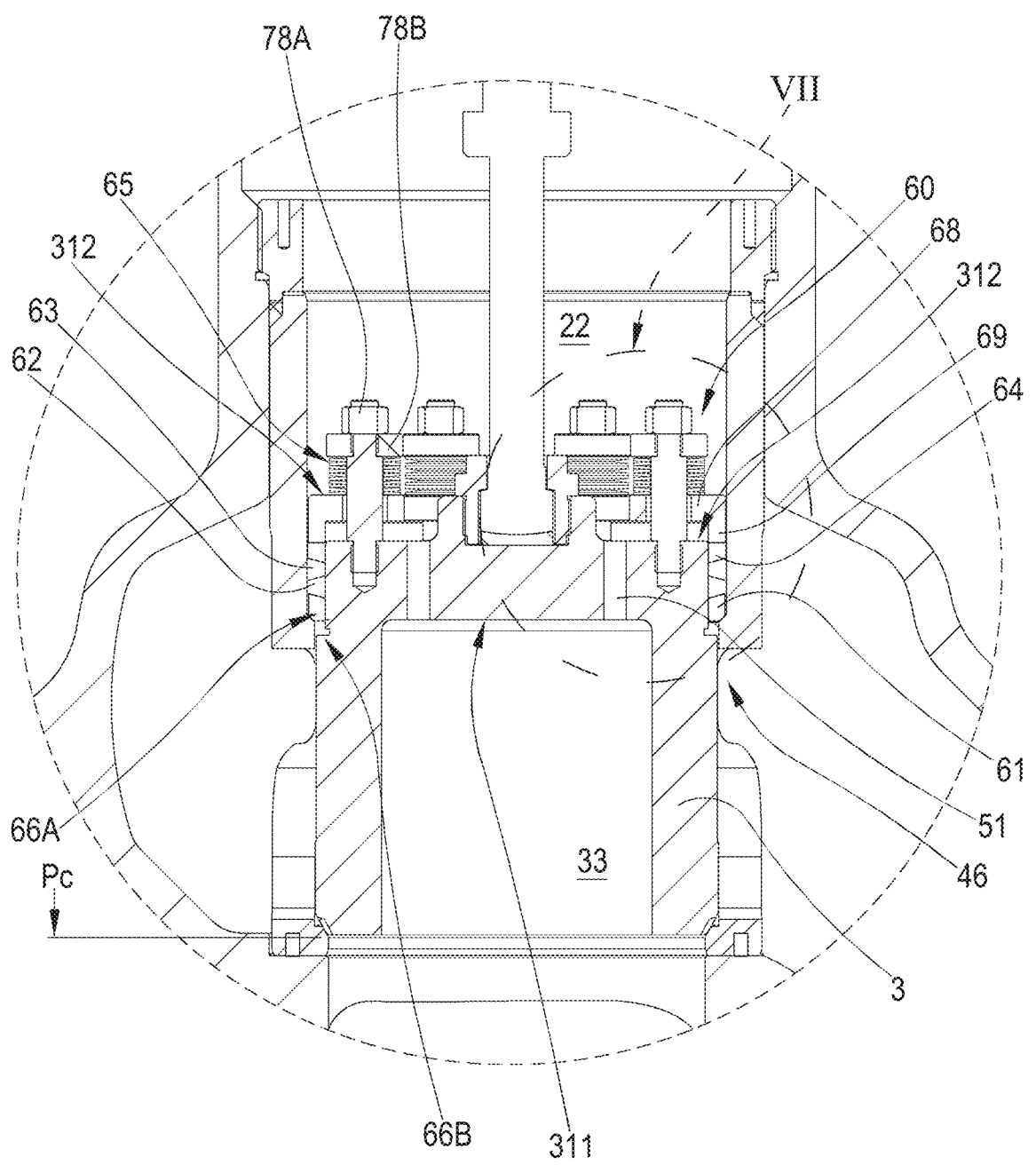
FIG. 6 is an enlargement of the detail VI of FIG. 5.
Figure 7:
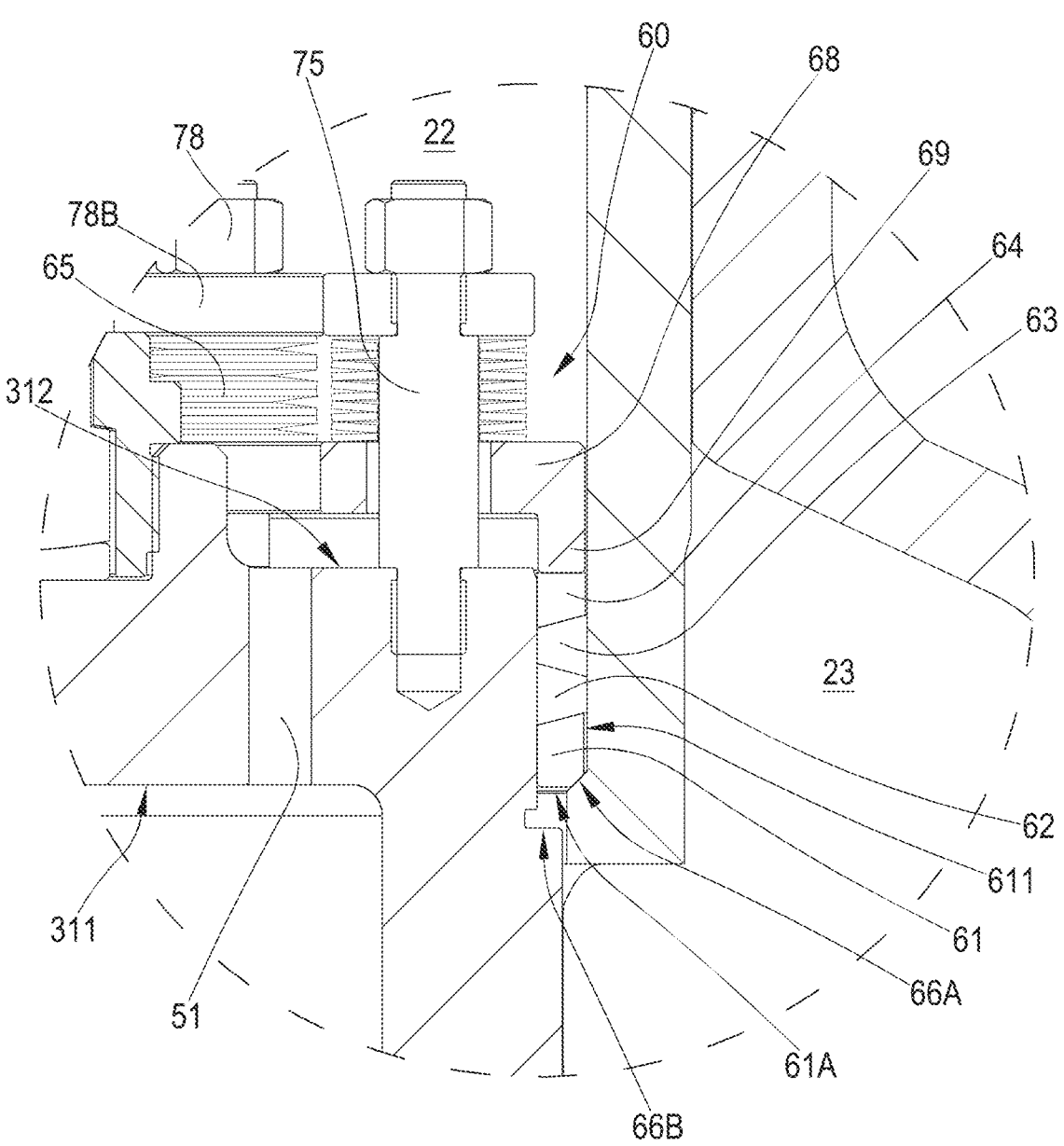
FIG. 7 is an enlargement of the detail VII of FIG. 6.
Figure 8:
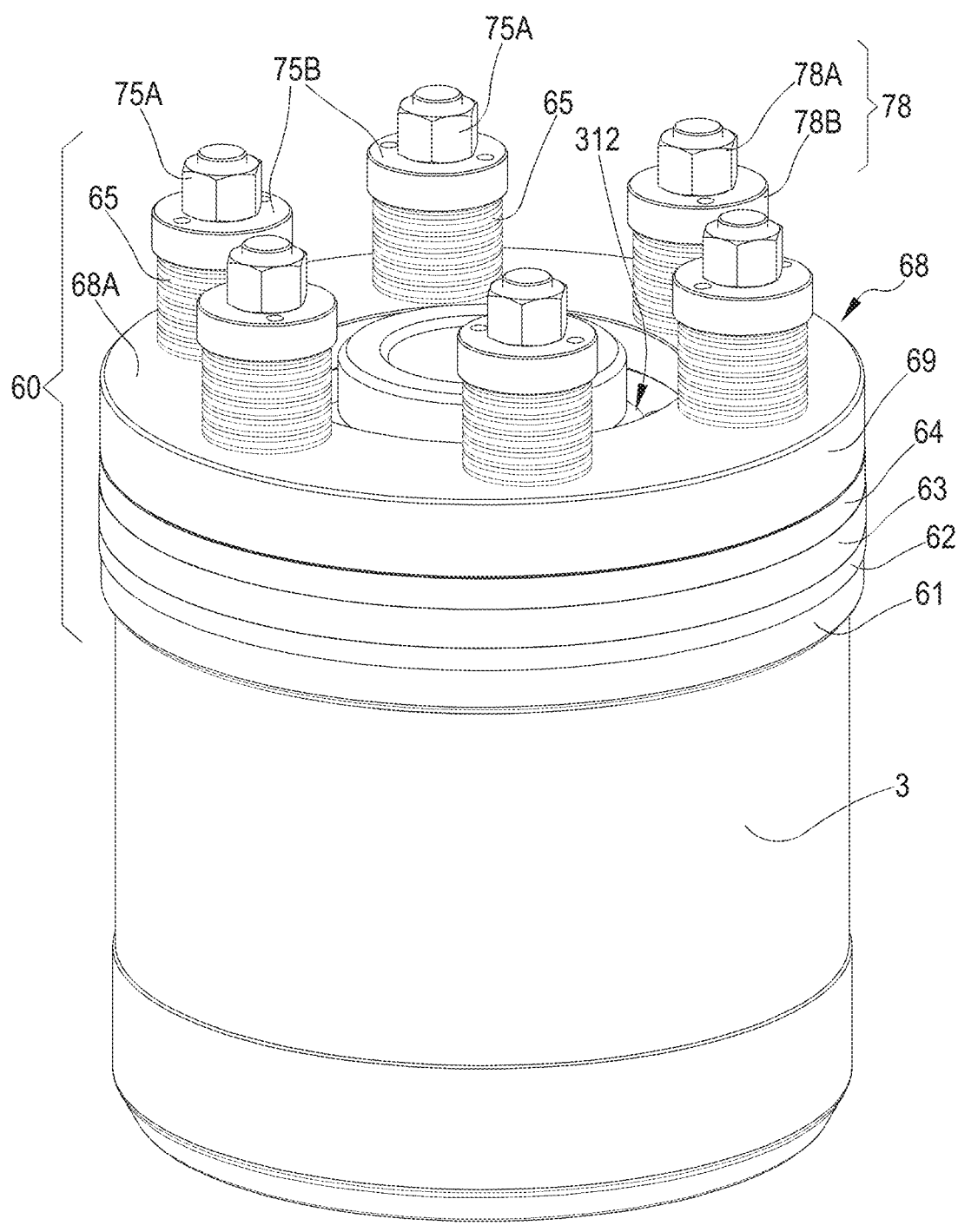
FIG. 8 is a perspective view of a component assembly of the valve of FIG. 1.
Figure 9:
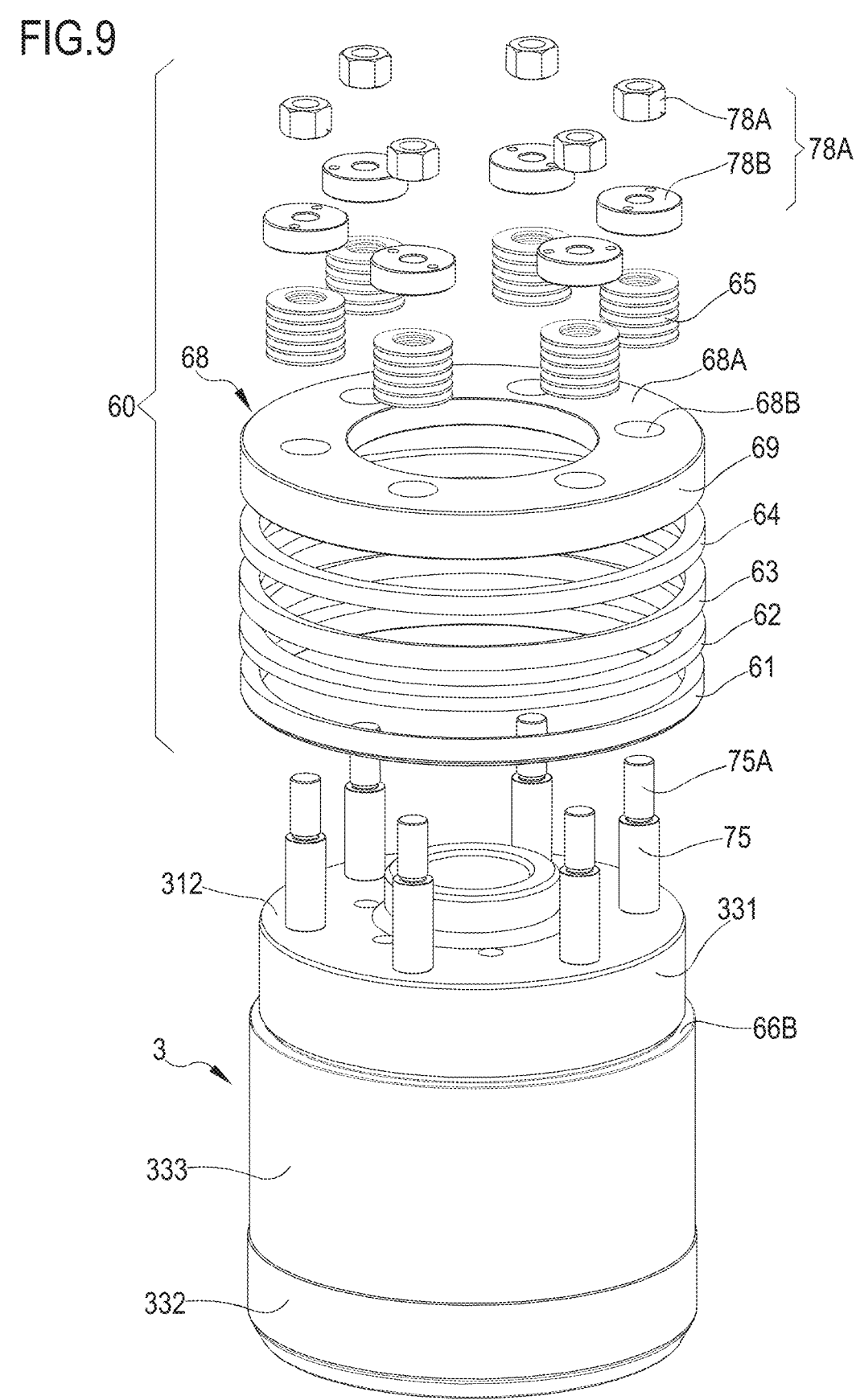
FIG. 9 is an exploded perspective view of the component assembly of FIG. 8.

With reference in particular to FIGS. 6 and 7, according to a possible, and therefore non-exclusive, embodiment, the sealing assembly 60 comprises four sealing rings 61, 62, 63, 64. In particular, two outer sealing rings (indicated by references 61 and 64) and two central sealing rings (indicated by references 62 and 63), located between the outer sealing rings, can be identified. Considering the sealing rings 61, 62, 63, 64 during assembly of the valve, their inner diameter corresponds to the diameter D2 of the first cylindrical surface 331 of the closure member 3 (see FIG. 10). The sealing rings 61, 62, 63, 64 are thus arranged around the first cylindrical surface 331 of the closure member 3 and, relative to the closure member 3, always remain located between the second abutment surface 66B and the flange 68 (as can be appreciated, for example, from FIG. 8).

A first outer sealing ring (reference 61) contacts one of the two abutment surfaces 66A, 66B defined above depending on the operating condition of the valve. The other outer sealing ring (reference 64) is always in contact with the annular edge 69 of the flange 68 due to the effect of the thrust applied by the elastic means 65 on said flange. The two central sealing rings 62, 63 are in contact with each other and each in contact with one of the outer sealing rings 61, 64 so as to form the packed sealing structure indicated above.

Each sealing ring 61, 62, 63, 64 may typically have a cross section having a trapezoidal shape, wherein this cross section is evaluated in a radial section plane passing through the axis of said sealing ring. The two sealing rings at the ends of packed sealing structure (indicated respectively by references 61 and 62) may typically have a cross section with a shape resembling a right trapezoid. Instead, the two central rings 62, 63 have a cross section resembling an isosceles trapezoid. Considering the packed structure in the radial section plane, the sealing rings 61, 62, 63, 64 are arranged so that each contacts the adjacent ring(s) at the inclined side of its cross section.

When the closure member reaches the position in which energizing begins (FIGS. 3 and 4), the sealing rings 61, 62, 63, 64 are axially forced at one side against the first abutment surface 66A and the other side against the annular edge 69 of the flange 68 on which the elastic means 65 act. The first abutment surface 66A prevents the sealing rings 61, 62, 63, 64 to move on together with the closure member 3 towards the closed position. This condition causes a radial expansion of all sealing rings 61, 62, 63, 64 in the annular seat 611. The trapezoidal shape of the cross section of the sealing rings 61, 62, 63, 64 optimizes this expansion effect and thus the final sealing.

In alternative embodiments, the sealing assembly 60 could comprise a different number of sealing rings than that indicated above. Likewise, also the configuration of the rings (namely the configuration of the radial section) could differ from that shown and described in the figures, provided that it is still suitable for the purposes. In a possible embodiment, for example, the sealing assembly could also comprise only one sealing ring provided with a first surface intended to contact the abutment surfaces 66A, 66B and with a second surface, opposite the first surface, that remains in contact with the annular edge 69. In this case, upon reaching the position in which energizing begins, the first abutment surface 66A acts on the first surface of the single sealing ring preventing the movement thereof in axial direction. The subsequent movement of the closure member 3 thus causes the ring to become energized according to the same principle set forth above.

According to an embodiment, shown in the figures, the flange 68 comprises a plane-shaped portion 68A having an annular shape, at the outermost end of which the annular edge 69 projects. In particular, this annular edge 69 extends along a direction orthogonal to a reference plane R-R (indicated in FIG. 10) in which the plane-shaped portion 68A extends. The outermost diameter de (indicated in FIG. 10) of the plane-shaped portion 68A may typically be substantially close to the inner diameter D2* (indicated in FIG. 11) of the first portion 431 of the cylindrical seat 43 of the cage body 40. In any case, the flange 68 is free to move relative to the cage body 40 when drawn by the closure member 3.

The inner diameter d2 (indicated in FIG. 10) of the plane-shaped portion 68A is instead greater than a diameter (indicated by dr in FIG. 12) of a reference circumference, considered in a plane transverse to the longitudinal axis Y-Y (at the second transverse surface 312 of the closure member 3), within which all pressure-balancing channels 51 are comprised. In other words, the plane-shaped portion 68A is configured so that these channels 51 are not obstructed, so as to allow the fluid to reach the balancing chamber 22.

The flange 68 is coupled to the closure member 3 through a plurality of coupling pins 75. Each pin 75 may typically be screwed to the body of the closure member 3 at the second surface 312. Each pin 75 extends through a corresponding opening 68B formed in the plane-shaped portion 68A of the flange 68.

In this embodiment, the elastic means 65 comprise a plurality of springs (also indicated by reference 65), in particular Belleville washers, each inserted onto one of the coupling pins 75 so as to be axially arranged between the flange 68 and a stop means 78 fixed to said coupling pin 75. In practice, one end of each spring 65 rests against the flange 68, while the other end rests against the stop means 78.

For each coupling pin 75 the respective stop means 78 may comprise a nut 78A screwed at the end of the coupling pin 75 opposite the end screwed to the closure member 3. For each coupling pin 75, the respective stop means 78 also comprises a washer 78B interposed between the nut 78A and the corresponding spring 65.

Figure 2:
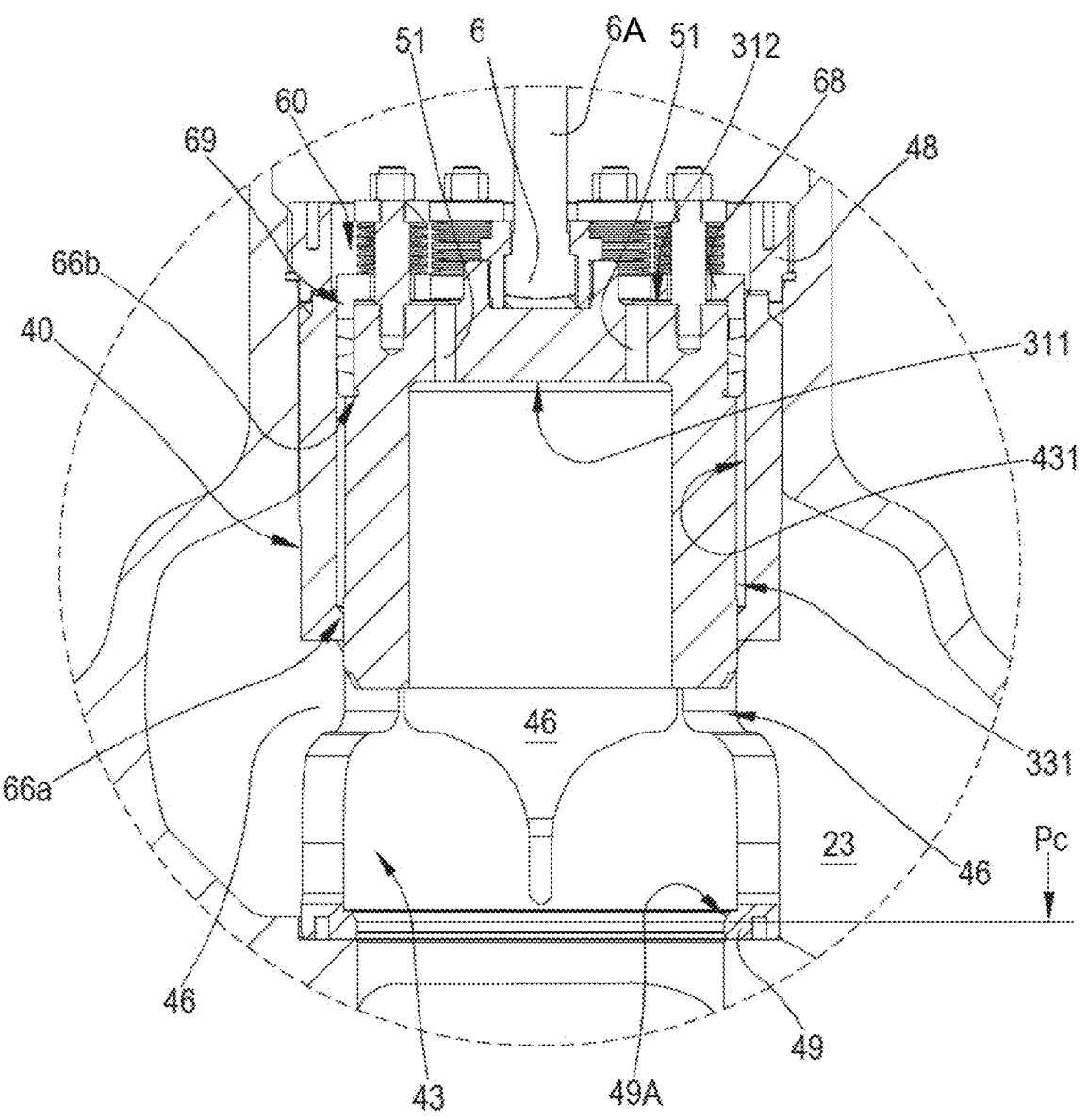
FIG. 2 is an enlargement of the detail II of FIG. 1.

With reference to FIGS. 1 and 7, the operating principle of the valve 1, in particular of the sealing assembly 60, according to the present disclosure, is described below. With reference to FIGS. 1 and 2, in a valve (fully or partially) open condition, the fluid flows through the lateral opening 46 of the cage body 40 and comes out from the fluid outlet port 212 of the valve body 1. Clearly, the flow rate depends on the position of the closure member 3 relative to the lateral opening 46 of the cage body 40. In this condition, sealing between the cage body 40 and the closure member 3 is not required.

In the valve full-open condition, the first outer ring 61 is in contact with the second abutment surface 66B, whereas the second outer sealing ring 64 is in contact with the annular edge 69 of the flange 68. As a whole, the sealing rings 61, 62, 63, 64 are subject to the thrust applied by the elastic means 65 on the flange 68. The closure member 3 is in a position whereby the second abutment surface 66B is at a greater axial distance from the closing plane PC than the first abutment surface 66A.

The movement of the closure member 3 towards the closed position causes a gradual movement of the second abutment surface 66B towards the first abutment surface 66A until reaching the condition, clearly visible in FIG. 4, whereby the two abutment surfaces 66A, 66B are substantially at the same height relative to the closing plane PC. In this condition, which is achieved before the closure member 3 reaches the closed position, the first outer sealing ring 61 contacts both abutment surfaces 66A, 66B.

Therefore, to obtain complete closing from the position shown in FIG. 3 the closure member 3 still has to carry out a last part of its stroke S (indicated in FIG. 4). By acting on the first outer sealing ring 61, the first abutment surface 66A prevents the movement of the packed sealing structure in axial direction. As the closure member 3 starts to carry out said last part of its stroke S, the sealing rings 61, 62, 63, 64 become energized as they are compressed between the first abutment surface 66A and the annular edge 69 of the flange 68; this compression causes their expansion in the annular seat 611.

Figure 5:
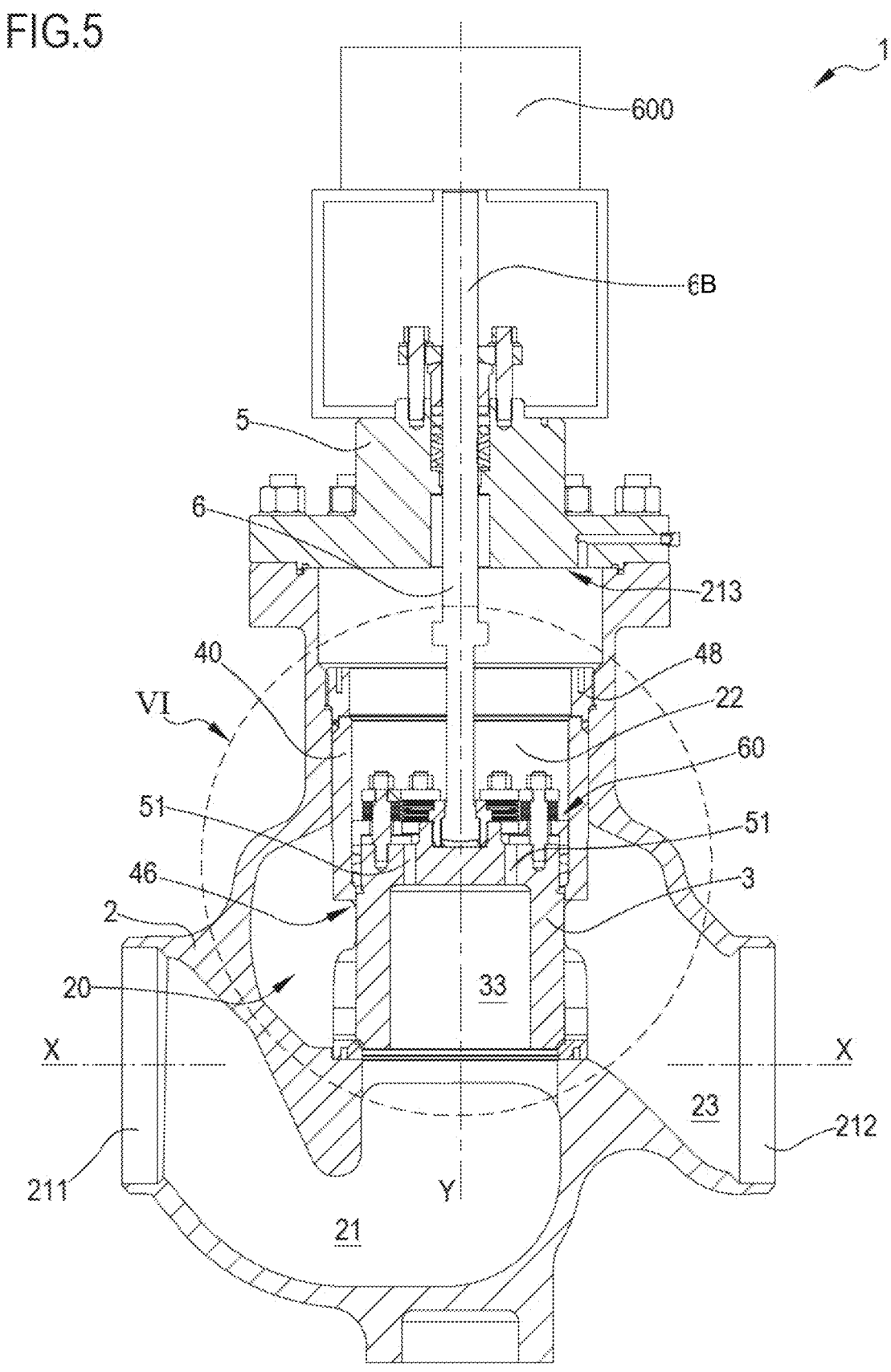
FIG. 5 is a further longitudinal section view of the valve of FIG. 1 during closing of the valve.

Energizing of the sealing rings 61, 62, 63, 64 is completed when the closure member 3 reaches the closed position (plane PC indicated in FIGS. 4 and 6), shown in FIGS. 5 and 6. In this condition, the second abutment surface 66B lies in an axial position closer to the closing plane PC than the first abutment surface 66A.

Energizing of the sealing rings 61, 62, 63, 64 is mechanical, since it is obtained as a result of the mechanical action carried out on one side by the first abutment surface 66A and on the other side by the flange 68, within the final stage of the movement of the closure member 3 towards the closed position. Advantageously, energizing of the sealing rings 61, 62, 63, 64 occurs autonomously each time the closure member 3 reaches the full-closed position.

When the closure member 3 moves from the closed position towards the full-open position, upon reaching the condition of FIG. 4, the action carried out by the first abutment surface 66A on the sealing rings 61, 62, 63, 64 ceases and they are subjected to the sole action of the flange 68 pushed by the elastic means 65.

With reference to the detail view of FIG. 7, it is noted that when closing is completed, the pressure at the lower surface 61A of the first outer sealing ring 61 corresponds to the outlet pressure of the valve 1 and thus is lower than the pressure in the balancing chamber 22, which instead coincides with the pressure of the inlet fluid. Therefore, there is a pressure imbalance that further pushes the flange 69 concurrently with the thrust applied by the elastic means 65. This further thrust clearly promotes fluid seal.

From the above, the sealing rings 61, 62, 63, 64 can be made of a plastic material (e.g. PTFE or PEEK), without the need to include, in their structure, springs or other energizing elements. As indicated above, in a valve open condition the pressure in the balancing chamber is minimum and the sealing rings 61, 62, 63, 64 are in fact subjected only to the thrust applied, via the flange 68, by the elastic means 65. Therefore, the sealing rings 61, 62, 63, 64 are in fact not energized during the valve regulation stage, i.e., when the closure member moves relative to the cage body 40. Therefore, the wear of the sealing rings 61, 62, 63, 64 is greatly reduced, i.e., the service life of the rings is advantageously increased.

According to an embodiment, shown in the figures, the cylindrical body of the closure member 3 has a cavity 33 whose bottom defines the first surface 311 of the closure member, from which the channels 51 for balancing the pressure extend. This cavity 33 gives the closure member a partially hollow configuration, as readily apparent form the figures. At the same time, the cavity 33 allows the closure member 3 to be lightened and hence the total weight of the valve to be limited.

Figure 10:
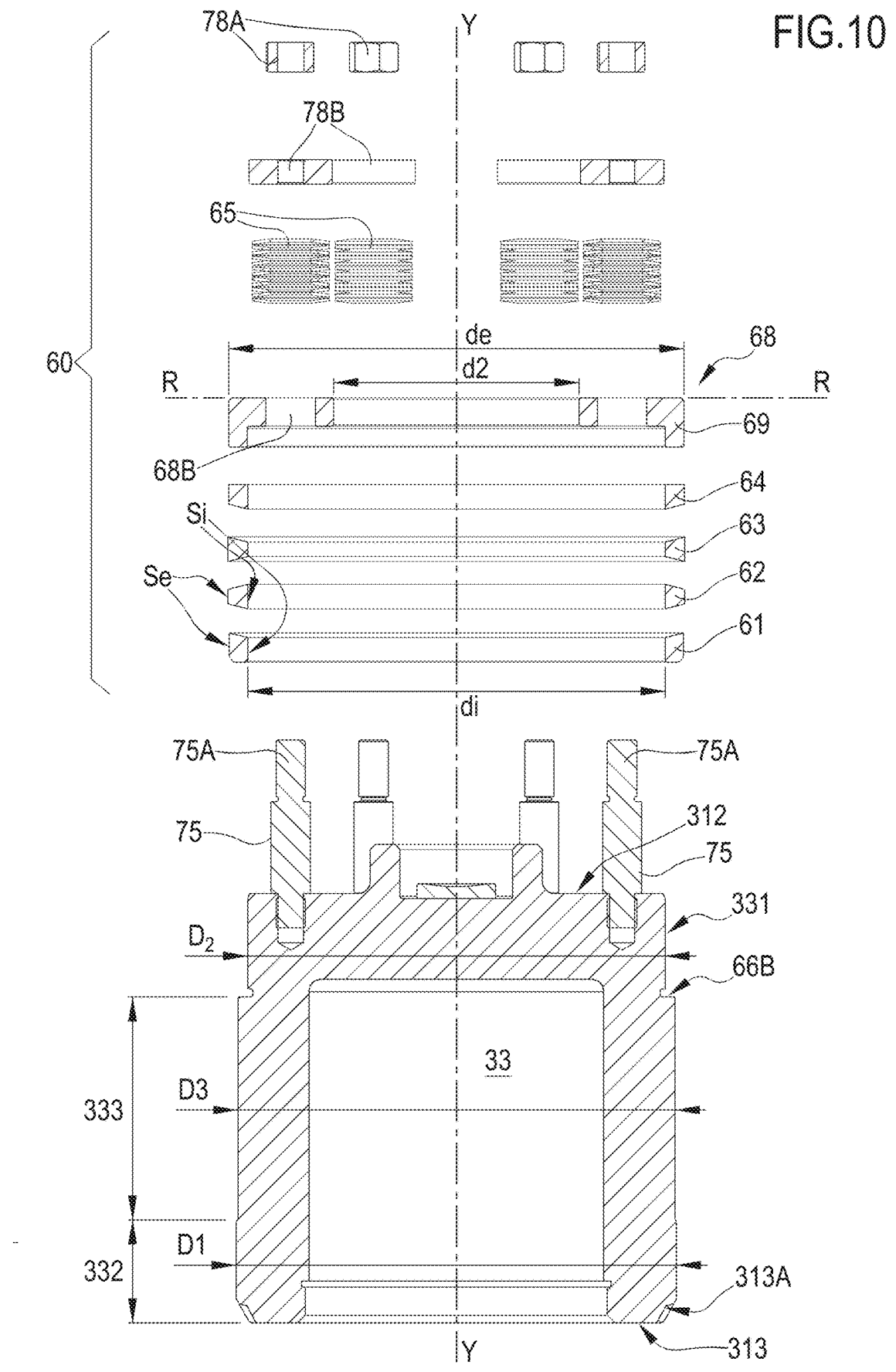

The closure member 3 comprises a second outer cylindrical portion 332 having a diameter (indicated by D1) greater than the diameter (indicated by D2) of the adjacent first cylindrical portion 331 partially delimiting the annular seat 611 in which the sealing rings 61, 62, 63, 64 are arranged (see FIG. 10). The sliding seat 43 is defined by a second cylindrical portion 432 of the cage body 40 adjacent to the first cylindrical portion 431 indicated above. The diameter (indicated by D1* in FIG. 11) of this second cylindrical portion 432 corresponds to the diameter (indicated by D1 in FIG. 10) of the second cylindrical portion 332 of the closure member 3, wherein the two diameters (D1 and D1*) define a coupling that allows the closure member 3 to translate in the sliding seat 43.

As apparent from the figures, the closure member 3 may typically comprise a third outer cylindrical portion 333 comprised between the first cylindrical portion 331 and the second cylindrical portion 332. This third outer cylindrical portion 333 has a diameter D3 (see FIG. 10) greater than the diameter of the first outer cylindrical portion 331 and smaller than the diameter of the second outer cylindrical portion 332. The axial extension of the third outer cylindrical portion 333 is instead greater than the diameter of the other two outer cylindrical portions 331, 332. Through this solution, only the second portion 332 (i.e., a portion of limited axial extension) of the closure member 3 is advantageously in contact with the second portion 432 of the sliding seat 43.

According to an embodiment, shown in the figures, the position of the cage body 40 in the cavity 20 is fixed through a locking element 48. In particular, positioning of the cage body 40 takes place by insertion through the entry opening 213. When this insertion is completed, the locking element 48 is screwed (inside the cavity 20) so as to act on a second end portion 40B of the cage body 40, thereby fixing it in position.

The inner cavity 20 defines a seat 222 (indicated in FIG. 11) on which an annular support element 49 is positioned, on which the cage body 40 is coaxially supported. This annular element 49 defines the closing plane PC, i.e., the closed position for the closure member 3. The latter may comprise a transverse surface 313 (indicated in FIG. 10) defining the inlet of the cavity 33. Between the second cylindrical portion 332 of the closure member 3 and this transverse surface 313 a bevel 313A is defined, which cooperates with a conical surface 49A (indicated in FIG. 2) of the support element 49 for the seal between the first portion 21 and the third portion 23 of the inner cavity 20 defined above.

Figure 11:
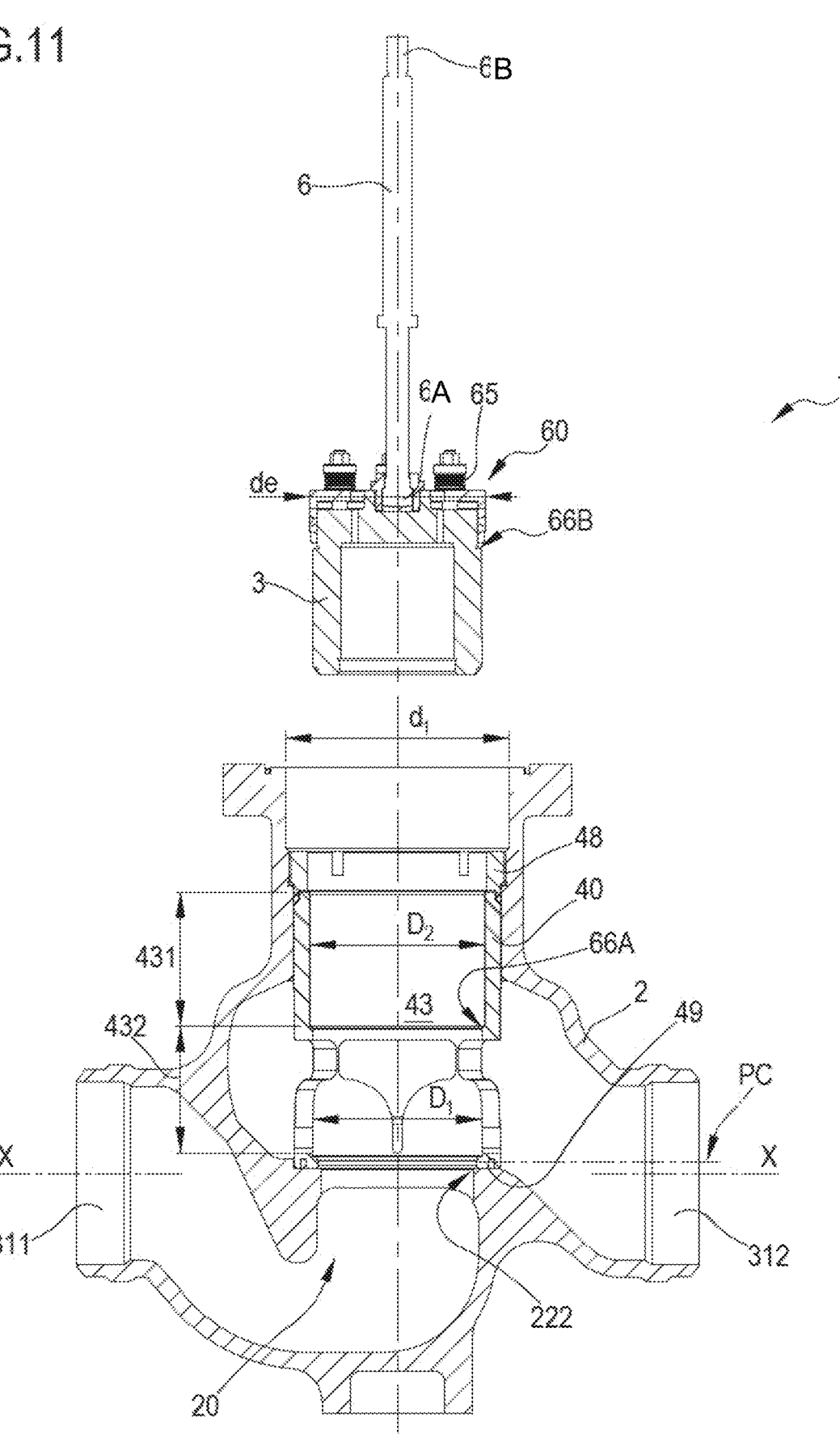
FIG. 11 is a longitudinal section view of the valve of FIG. 1 in a first assembling step.
Figure 12:
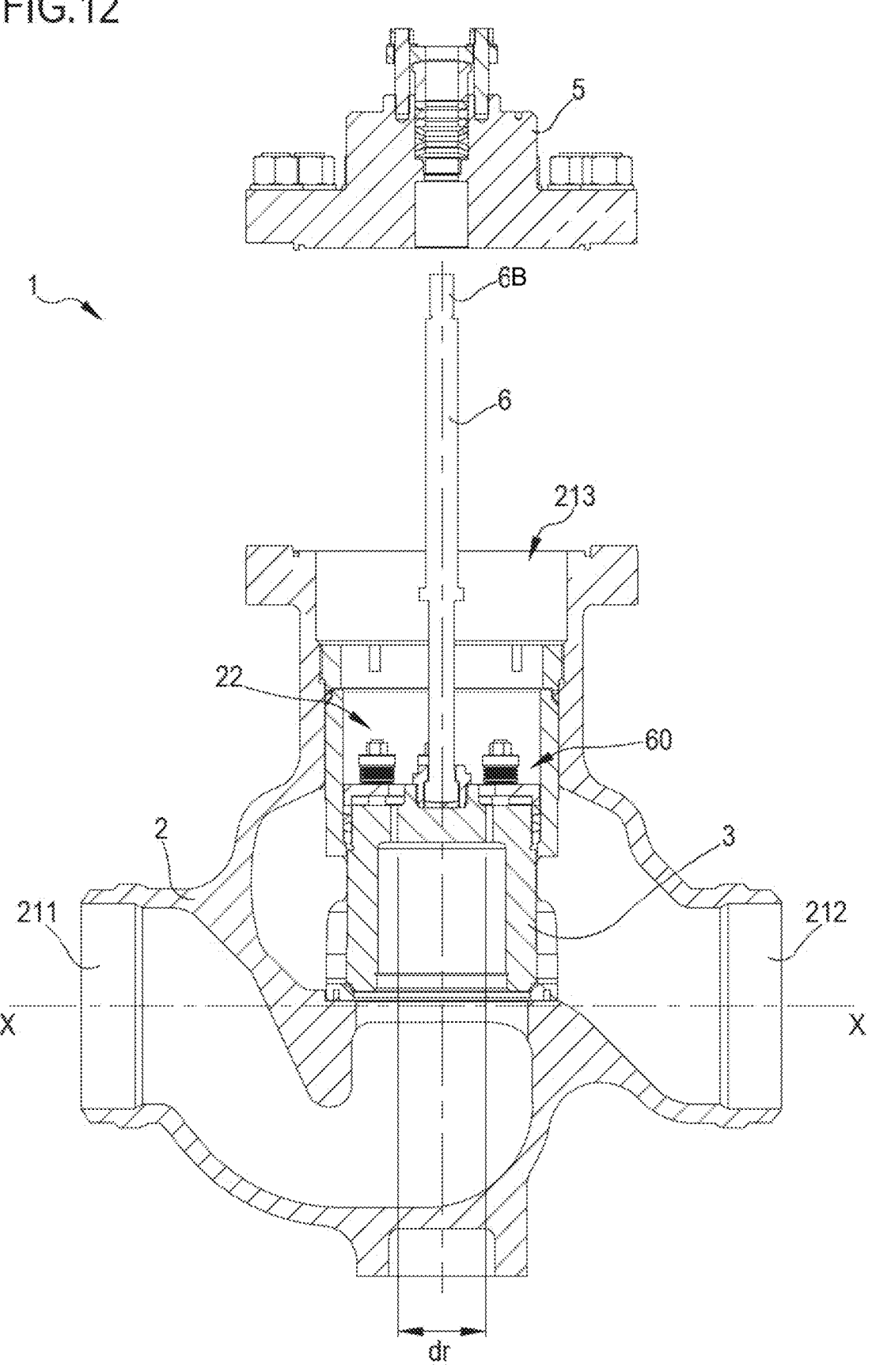
FIG. 12 is a longitudinal section view of the valve di FIG. 1 in a second assembling step.

With reference in particular to FIGS. 11 and 12, it can be noted that the sealing assembly 60 described above is very advantageous also as far as the assembly/mounting of the valve itself is concerned. In fact, the sealing assembly 60 is coupled to the closure member 3 and is thus positioned together with it inside the valve body 2. The sealing rings 61, 62, 63, 64 are arranged between the second abutment surface 66B and the annular edge 69 of the flange 68 and are thus subjected to a pre-loading action carried out by the elastic means 65 alone.

From FIG. 11 it is readily apparent that the closure member 3, coupled to the sealing assembly 60, is first connected to the stem, and the component assembly (3, 60, 6) thus formed is then coupled to the valve body 2. In particular, by means of the stem 6, the closure member 3 and the sealing assembly 60 are inserted into the cage body 40 after it has been fixed inside the valve body 2 by means of the locking ring 48. With reference to FIG. 12, after the aforesaid component assembly (3, 60, 6) has been positioned, the entry opening 213 can be closed by placing the bonnet 5, thus defining the pressure balancing chamber 22 indicated above.

According to an embodiment shown in FIG. 13, the valve (indicated by reference 1') comprises a valve body extension 4 arranged above the valve body 2. An inner chamber 400 is delimited between the valve body extension 4 and the valve body 2. The inner chamber 400 and the valve body 2 are internally accessible through a top entry opening 50 of the valve 1', which is defined at a first end 410 of the valve body extension 4, longitudinally opposite to a second end 415 connected to the valve body 2 at the entry opening 213 of the valve body 2.

The top entry opening 50 of the valve 1' is closed by the bonnet 5. The inner chamber 400 and the bonnet 5 are traversed by the stem 6, to which the closure member 3 positioned in the valve body is connected. A flange 51 defining a seat for a sealing plate 58 is connected to said first end 410 of the valve body extension 4. The bonnet 5 is removably connected to the flange 51.

A bellows seal 9 surrounding the stem 6 may typically be arranged in the inner chamber 400. The bellows seal 9 comprises a longitudinal end 9A fixed, for example welded, to the lower side of the sealing plate 58 and a second end fixed, for example welded, to a ring 91 integral in translation with the stem 6.

The valve 1' shown in FIG. 13 further comprises a thermal insulation assembly 7, removably received in the inner chamber 400, between the valve body 2 and the top entry opening 50 of the valve 1'. The thermal insulation assembly 7 has the function of thermally separating a first region of the inner chamber 400 adjacent to the valve body 2, which in operating conditions is at cryogenic temperature, from a second region of the inner chamber 400 adjacent to the top entry opening 50 and to the bonnet 5, which in operating conditions can instead be at higher temperatures, for example at ambient temperature. In particular, the thermal insulation assembly 7 is configured so as to substantially limit conductive and convective heat exchanges that can occur in the inner chamber 400 due to the temperature difference between the aforesaid two regions.

The thermal insulation assembly 7 comprises a containment chamber 71 having a cylindrical annular shape, coaxial relative to the inner chamber 400, and hence to the stem 6, along its longitudinal axis Y-Y. At least at an end portion 71A close to the valve body 2, the containment chamber 71 is closed by a containment plate 710. The containment chamber 71 is filled with solid thermally insulating material, such as grade G10-FR4 vetronite. The thermally insulating material may typically form a solid body, made in one piece or in several pieces.

The containment chamber 71 may typically be fixed to the stem 6 so that it can be inserted together with it into the inner chamber 400, greatly facilitating assembly and/or maintenance operations of the valve 1'. In practice, also in the case of extended configuration and hence in the presence of the thermal insulation assembly 7, it is possible to extract/insert the closure member 3 and the sealing assembly 60 in a particularly easy and quick manner, operating only at the top entry opening 50 of the valve 1', without the need to directly reach the inner cavity 20 of the valve body 2.

FIG. 14 shows an alternative embodiment (indicated by reference 1") to that shown in FIGS. 1 to 12, which differs only by having a different structure of the valve body 2. The latter has a substantially T-shaped configuration, so that the fluid inlet port 211 has an axis X1 substantially orthogonal to the axis X of the fluid outlet port 212 and substantially parallel to, or coincident with, the axis Y of the stem 6 and of the closure member 3. For the remaining part, the solutions pertaining the sealing assembly 60 and the structure of the closure member 3 and of the cage body 40 are substantially the same as those indicated above.

FIG. 15 refers to a further embodiment (indicated by 1'") of a valve according to the invention, in this case configured as ON-OFF valve. The construction of the valve corresponds to that of the control valve of FIG. 14 and differs therefrom only by the different configuration of the openings 46 of the cage body.

From the above it is apparent how the present disclosure enables the set aims and objects to be achieved. In particular, a pressure-balanced valve as disclosed herein, which can be used both as a control valve and as an ON-OFF valve, whose sealing system is marked by a longer service life as compared to that of prior art solutions. The longer service life derives from the fact that the sealing elements are energized when the valve is closed, whereas they maintain a non-energized condition during valve regulation (when the closure member is subject to oscillations relative to the cage body). Advantageously, the sealing assembly as disclosed herein is easy to produce and assemble, as it can be inserted (and subsequently removed) together with the closure member, by means of the stem to which the closure member is connected.

What is claimed is:

1. A pressure-balanced valve, comprising:
   a valve body comprising a fluid inlet port and a fluid outlet port, and an inner cavity whereby the fluid inlet port communicates with the fluid outlet port, wherein the inner cavity is accessible through a top entry opening of the valve;
   a removable bonnet configured to close the top entry opening;
   a cage body arranged in the inner cavity and associated with the valve body in a fixed position, wherein the cage body defines a sliding seat for a closure member, wherein the cage body comprises at least one lateral opening for fluid flow;
   a closure member movable in the sliding seat between a closed position, whereby the lateral opening of the cage body is closed, and a full-open position, whereby the lateral opening of the cage body is totally free, wherein the closure member comprises at least one pressure-balancing channel extending between a first surface of the closure member and a second surface of the closure member, wherein the channel provides for communication between a first portion of the inner cavity delimited between the fluid inlet port and the first surface of the closure member and a second portion of the inner cavity delimited between the bonnet and the second surface of the closure member;

a stem comprising a first end connected to the closure member at the second surface and a second end connected to a valve actuator, wherein the stem extends through the second portion of the inner cavity;
   a sealing assembly providing a fluid seal between the second portion of the inner cavity and a third portion of the inner cavity communicating with the outlet port, wherein the sealing assembly comprises:
      at least one sealing ring arranged about a first cylindrical portion of the closure member and contacting a first cylindrical portion of the sliding seat of the cage body, wherein the first cylindrical portion of the sliding seat is axially delimited by a first abutment surface and wherein the first cylindrical portion of the closure member is axially delimited by a second abutment surface,
      at least one thrust annular flange arranged in the second portion of the inner cavity in a position adjacent to the second surface of the closure member, wherein the thrust annular flange comprises an annular edge in contact with a first surface of the at least one sealing ring and wherein the thrust annular flange is axially floating relative to the closure member; and
      elastic means pushing the thrust annular flange towards the second surface,
      wherein the abutment surfaces are defined so that, when the closure member moves towards the closed position, the at least one sealing ring comes into abutment, at a side opposite to the side contacting the annular edge, with the first abutment surface before the closure member reaches the closed position.

2. The pressure-balanced valve of claim 1, wherein the sealing assembly comprises a plurality of sealing rings arranged in packed configuration, wherein a sealing ring comes into abutment with the first abutment surface when the closure member moves towards the close position and before the closure member reaches the close position, and wherein another sealing ring is in contact with the annular edge of the thrust flange.

3. The pressure-balanced valve of claim 1, wherein the sealing assembly comprises a plurality of sealing rings arranged in a packed configuration, wherein a first outer sealing ring contacts the first abutment surface or the second abutment surface and a second outer sealing ring is contacted by the annular edge of the thrust flange, the plurality of sealing rings comprising at least one central sealing ring in contact with the first outer sealing ring and the second outer sealing ring.

4. The pressure-balanced valve of claim 3, wherein the plurality of sealing rings comprises two central sealing rings in contact with each other, wherein each central sealing ring contacts one of the outer sealing rings.

5. The pressure-balanced valve of claim 2, wherein the sealing rings have a cross section of a substantially trapezoidal shape, wherein the cross section is evaluated in a radial section plane.

6. The pressure-balanced valve of claim 1, wherein the thrust flange comprises a plane-shaped portion having an annular shape and the annular edge projects from an end of the plane-shaped portion in a direction substantially perpendicular to a reference plane in which the plane-shaped portion extends.

7. The pressure-balanced valve of claim 1, wherein the thrust flange is coupled in an axially floating manner with the closure member via a plurality of coupling pins projecting from the second surface of the closure member, wherein each coupling pin extends through an opening formed in the plane-shaped portion of the thrust flange.

8. The pressure-balanced valve of claim 7, wherein the elastic means comprise a plurality of springs each arranged about one of the coupling pins so as to be axially interposed between the thrust flange and a stop means fixed to the coupling pin, wherein the thrust flange is located between the springs and the second surface of the closure member.

9. The pressure-balanced valve of claim 8, wherein the stop means comprise at least one nut screwed at a free end of a corresponding coupling pin.

10. The pressure-balanced valve of claim 1, wherein the closure member comprises a second cylindrical portion having a diameter greater than a diameter of the first cylindrical portion and wherein the sliding seat of the cage body comprises a second cylindrical portion having a diameter smaller than a diameter of the first cylindrical portion of the sliding seat, and wherein the second cylindrical portion of the closure member contacts the second cylindrical portion of the sliding seat.

11. The pressure-balanced valve of claim 1, wherein the valve comprises a valve body extension connected to the valve body at the top entry opening, wherein the valve body extension defines an entry opening of the valve, wherein the entry opening is closed by the bonnet, wherein the valve body extension is traversed by the stem and defines an inner chamber having an annular shape in which a thermal insulation assembly is removably received.

12. The pressure-balanced valve of claim 1, wherein the at least one sealing ring lacks energizing elastic inserts.

* * * * *